United States Patent
Okuno

(10) Patent No.: US 6,868,203 B2
(45) Date of Patent: Mar. 15, 2005

(54) OPTICAL TRANSMISSION SYSTEM

(75) Inventor: Toshiaki Okuno, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 10/647,341

(22) Filed: Aug. 26, 2003

(65) Prior Publication Data

US 2004/0057661 A1 Mar. 25, 2004

(30) Foreign Application Priority Data

Aug. 29, 2002 (JP) ..................................... P2002-251632
Jun. 3, 2003 (JP) ..................................... P2003-158192

(51) Int. Cl.[7] .............................................. G02B 6/28
(52) U.S. Cl. ........................... 385/24; 398/81; 398/147
(58) Field of Search .............................. 385/24; 398/81, 398/147–148

(56) References Cited

U.S. PATENT DOCUMENTS

| | | | |
|---|---|---|---|
| 5,559,910 A | * 9/1996 | Taga et al. | 385/24 |
| 6,081,360 A | 6/2000 | Ishikawa et al. | |
| 6,137,604 A | * 10/2000 | Bergano | 398/1 |
| 6,311,002 B1 | 10/2001 | Evangelides et al. | |
| 6,445,850 B1 | * 9/2002 | Zhou et al. | 385/24 |
| 2003/0007217 A1 | 1/2003 | Fuerst et al. | |

FOREIGN PATENT DOCUMENTS

| | | |
|---|---|---|
| JP | 9-105833 | 4/1997 |
| JP | 11-204886 | 7/1999 |
| JP | P2000-156702 A | 6/2000 |

OTHER PUBLICATIONS

M. Kakui, et al. "2.4 Gbit/s repeaterless transmission over 306 km non–dispersion–shifted fiber using directly modulated DFB–LD and dispersion–compensating fiber", Electronics Letters, vol. 31, No. 1, pp. 51–52, (1995).

M. Tanaka, et al, "Water–peak–suppressed non–zero dispersion shifted fiber for full spectrum coarse WDM transmission in metro networks", OFC 2002, WA2.

* cited by examiner

Primary Examiner—Leo Boutsikaris
(74) Attorney, Agent, or Firm—McDermott Will & Emery LLP

(57) ABSTRACT

This invention relates to an optical transmission system which allows high quality transmission of signal light where a plurality of signal channels are multiplexed, and has a configuration that is particularly suitable for CWDM optical transmission. In the optical transmission system, the plurality of signal channels propagating through the optical fiber transmission line are demultiplexed into a signal channel group in the first wavelength band $\Lambda_1$ and a signal channel group in the second wavelength band $\Lambda_2$. Then, each signal channel in the second wavelength band $\Lambda_2$ where the absolute value of chromatic dispersion is large is dispersion-compensated. When the bit rate is B (Gb/s) at a specific wavelength in the second wavelength band $\Lambda_2$ where the total chromatic dispersion in the optical fiber transmission line and the dispersion compensator is highest, the chromatic dispersion value at this specific wavelength is set to be grater than 0 (ps/nm) but $7500/B^2$ (ps/nm) or less, and is set such that the loss in the second wavelength band $\Lambda_2$ is lower than the highest loss in the first wavelength band $\Lambda_1$.

20 Claims, 10 Drawing Sheets

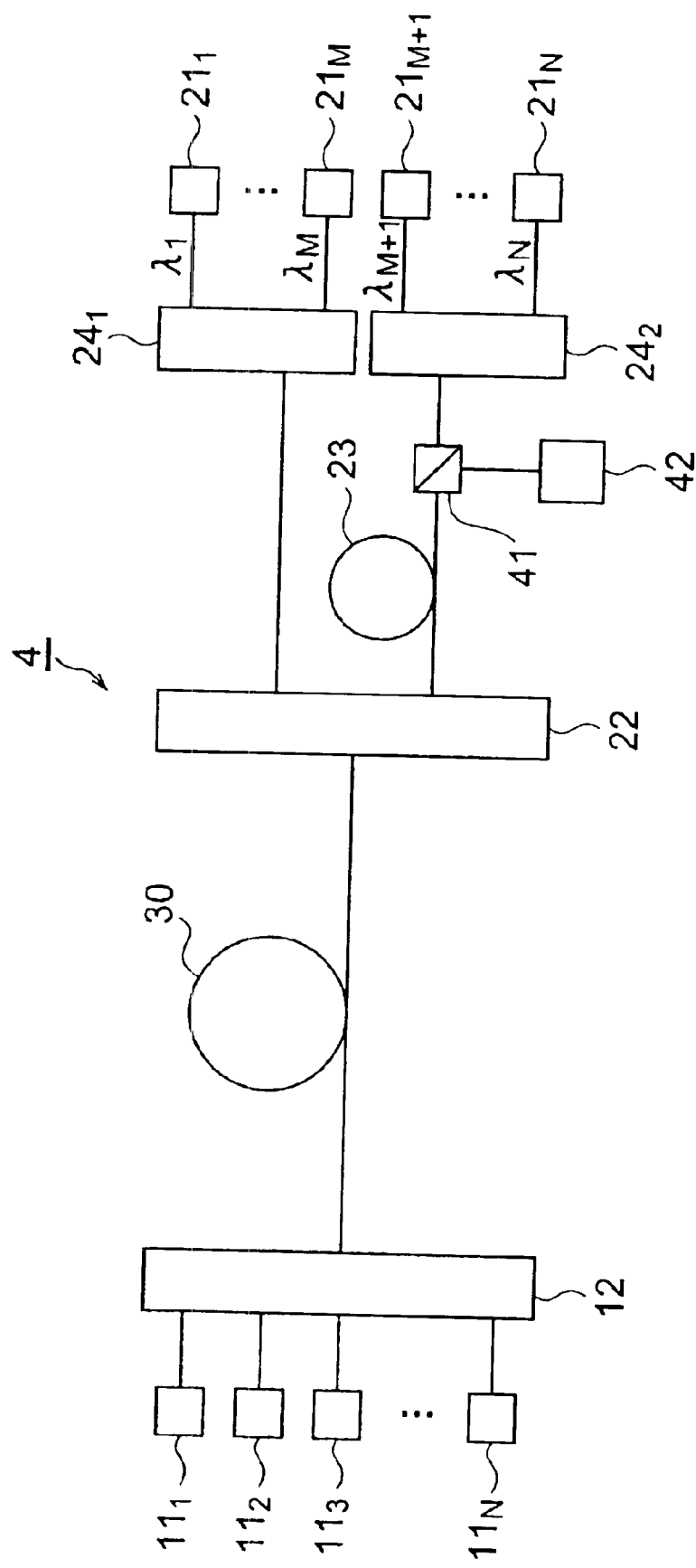

OPTICAL TRANSMISSION SYSTEM

BACKGROUND OF THE INVENTION

1. Field of the Invention

The present invention relates to an optical transmission system for transmitting signal light (multiplexed signal light), where a plurality of signal channels included in a signal wavelength band are multiplexed, via an optical fiber transmission line.

2. Related Background Art

A Wavelength Division Multiplexing (WDM) optical transmission system transmits multiplexed signal light including a plurality of signal channels via an optical fiber transmission line so as to enable the high-speed transmission/reception of large capacity information. The optical transmission system can suppress waveform deterioration of signal light by decreasing the absolute value of the accumulated chromatic dispersion of an entire signal light propagation path. By this, the optical transmission system can increase the bit rate and allow larger capacity.

For example, the optical transmission system disclosed in Japanese Patent Laid-Open No. 11-204866 has a configuration for demultiplexing a plurality of signal channels included in the multiplexed signal light into a plurality of bands, and performing dispersion compensation for each band, by this, the absolute value of the accumulated chromatic dispersion is decreased for each band.

In Document 1, "D. A. Atlas, 'Chromatic dispersion limitations due to semiconductor laser chirping in conventional and dispersion-shifted single-mode fiber systems', Optics Letters, Vol. 13, No. 11, pp. 1035–1037 (1988)", the relationship between the accumulated chromatic dispersion and the transmission characteristics, in a system where a direct modulation semiconductor laser light source is applied for the signal light source, is shown. In Document 1, the values of dispersion resistance, to acquire good signal light transmission quality, are stated, where the dispersion resistance is 1200 ps/nm when the bit rate is 2.5 Gb/s, and the dispersion resistance is 80 ps/nm when the bit rate is 10 Gb/s.

The optical transmission system stated in Document 2, "M. Kakui, et al, '2.4 Gbit/s repeaterless transmission over 306 km non-dispersion-shifted fiber using directly modulated DFB-LD and dispersion-compensating fiber', Electronics Letters, Vol. 31, No. 1, pp. 51–52, (1995)" intends to make the absolute value of accumulated chromatic dispersion to roughly zero, where the direct modulation semiconductor laser light source is used as the signal light source and dispersion-compensating optical fiber is used as the dispersion compensator.

Also in the optical transmission system stated in Document 3, "M. Tanaka, et al, 'Water-peak-suppressed non-zero dispersion shifted fiber for full spectrum coarse WDM transmission in metro networks', OFC 2002, WA2", an optical fiber having a loss peak due to an OH-radical near the wavelength of 1.38 µm is decreased, is applied. Document 3 shows the case where a direct modulation semiconductor laser light source is used for the signal light source, where the accumulated chromatic dispersion is about 1000 ps/nm and the transmission penalty is 1 dB when the bit rate is 2.5 Gb/s.

SUMMARY OF THE INVENTION

After studying conventional optical transmission systems, the present inventor discovered the following problem. An optical transmission system which performs CWDM (Coarse WDM) optical transmission, in which the signal light channel spacing (signal wavelength spacing) is relatively wide (see Japanese Patent Laid-Open No. 2000-156702, for example), is generally applied to a route where communication demand is relatively small, and normally a semiconductor laser light source, which is used as the signal light source, is directly modulated, and dispersion compensation is not performed because of the demand to decrease system cost.

On the other hand, optical fibers used as the optical fiber transmission line generally have positive chromatic dispersion in the signal wavelength, so when dispersion is compensated, dispersion compensating optical fiber, having negative chromatic dispersion in the signal wavelength, is inserted in the optical fiber transmission line. However, the dispersion compensator represented by the dispersion compensating optical fiber generally has the tendency for the insertion loss to increase as the absolute value of the dispersion compensating amount increases. Therefore, when dispersion is compensated more than necessary, the transmission loss of the entire system increases remarkably.

With the foregoing in view, it is an object of the present invention to provide an optical transmission system which allows high quality transmission of signal light where a plurality of signal channels in the signal wavelength band are multiplexed, and has a structure which is particularly suitble for CWDM optical transmission.

The optical transmission system according to the present invention comprises, an optical transmitter including a direct modulation light source, an optical receiver, at least one optical fiber transmission line disposed between the optical transmitter and the optical receiver, and at least one dispersion compensator. A plurality of signal channels included in the signal wavelength band are multiplexed as signal light. The optical receiver receives the signal light outputted from the optical transmitter. The optical fiber transmission line is a transmission medium through which the signal light (multiplexed signal light), where the plurality of signal channels are multiplexed, propagates. The dispersion compensator disperse-compensates for the signal channel group in the second wavelength band, other than the first wavelength band including the zero-dispersion wavelength of the optical fiber transmission line. Of cause, the optical transmitter may output some signal channels in the signal wavelength band.

In this optical transmission system, a plurality of signal channels are multiplexed by a multiplexer first, then the multiplexed signal light propagates through the optical fiber transmission line. Then the signal channels included in the multiplexed signal light are demultiplexed by the demultiplexer, and each one of the signal channels are received by the optical receiver, respectively. Therefore, in the configuration where the dispersion compensator is disposed on an optical path between the signal transmitting end of the optical transmitter and the signal entering end of the optical fiber, the multiplexer for multiplexing the signal channel group in the second wavelength band among the plurality of signal channels is disposed in the previous stage of the dispersion compensator. In the case of the configuration where the dispersion compensator is disposed on one of an optical paths between the signal outputting end of the optical fiber transmission line and the signal receiving end of the optical receiver, the demultiplexer, for demultiplexing the plurality of signal channels into the signal channel group in the first wavelength band and the signal channel group in the second wavelength band, is disposed in the previous stage of the dispersion compensator.

Particularly, with the optical transmission system according to the present invention, when the bit rate is B (Gb/s) at the specific wavelength in the second wavelength band where the total chromatic dispersion in the optical fiber transmission line and the dispersion compensator becomes the highest, the chromatic dispersion value at this specific wavelength is greater than 0 (ps/nm) but $7500/B^2$ (ps/nm) or less. Also, in this entire system the loss of each signal channel in the second wavelength band is smaller than the highest loss among of the losses in the signal channels in the first wavelength band. Or the lowest received power among the received powers for the signal channels in the second wavelength band is higher than the lowest optical power among the optical powers in the optical fiber transmission line of the signal channels in the first wavelength band.

In accordance with the optical transmission system having the above mentioned structure, the chromatic dispersion in the signal channel group of the second wavelength band other than the first wavelength band, among the plurality of signal channels from the optical transmitter, is dispersion-compensated by the dispersion compensator which is disposed in a previous stage, in mid-stage, or in the subsequent stage of the optical fiber transmission line. This is because the first wavelength band is a wavelength band including the zero-dispersion wavelength of the optical fiber transmission line, and the second wavelength band is the other wavelength band. In other words, the second wavelength band is a wavelength band where the absolute value of chromatic dispersion is larger than the first wavelength band near the zero-dispersion wavelength, so the chromatic dispersion in the signal channel group of the second wavelength band is selectively dispersion-compensated. And by setting the chromatic dispersion characteristic and the loss characteristic of the entire system including the optical fiber transmission line and dispersion compensator of this system as mentioned above, the optical transmission system according to the present invention allows high quality transmission of signal light where a plurality of signal channels included in the signal wavelength band are multiplexed, particularly CWDM optical transmission. Also, the dispersion compensator can be disposed only for the signal channels in the second wavelength band, and system cost decreases. Also, the signal channel spacing is wide in the CWDM optical transmission, so an inexpensive optical filter can be used as the demultiplexer.

In the optical transmission system according to the present invention, it is preferable that the total chromatic dispersion in the optical fiber transmission line and the dispersion compensator is greater than 0 (ps/nm) but $7500/B^2$ (ps/nm) or less in all the signal channels in the second wavelength band. In this case, the amount of dispersion compensation in the second wavelength band can be decreased, and the increase of loss in the second wavelength band can be effectively suppressed. Therefore, higher quality signal light transmission becomes possible.

Also, in the optical transmission system according to the present invention, it is preferable that the bit rate of at least one signal channel among the signal channels included in the second wavelength band is higher than any bit rate of all the signal channels in the first wavelength band. In this case, the transmission speed can be upgraded intentionally from the dispersion compensated side, therefore a system improvement with a simple configuration at low cost can be expected.

In the optical transmission system according to the present invention, it is preferable that the dispersion compensator includes a dispersion compensating optical fiber. In this case, a decrease in loss can be expected when the amount of dispersion compensation is low, and an increase in loss in the second wavelength band can be suppressed more conspicuously.

Also, in the optical transmission system according to the present invention, the optical fiber transmission line may include a single-mode optical fiber having a zero-dispersion wavelength near the wavelength of 1.3 μm. In this case, an optical fiber transmission line which includes a single-mode optical fiber, which has already been laid, can be used, so system cost decreases.

In the optical transmission according to the present invention, it is preferable that the optical fiber transmission line, at the wavelength of 1.38 μm, has a transmission loss smaller than a transmission loss at the wavelength of 1.31 μm. In this case, the signal channel near the wavelength of 1.38 μm can be used, which makes larger capacity possible.

In the optical transmission system according to the present invention, it is preferable that the optical fiber transmission line has a zero-dispersion wavelength which exists in a wavelength range of 1.35 μm to 1.5 μm. In this case, the chromatic dispersion of the optical fiber transmission line at the shorter wavelength side of the signal wavelength band is at a negative value (or a slightly positive value), so the transmission characteristics of all the signal channels included in the signal wavelength band can be improved.

It is also preferable that the optical transmission system according to the present invention further comprises pumping light supply means for supplying Raman amplification pumping light into this optical fiber transmission line, so as to Raman-amplify the signal light propagating through the optical fiber transmission line. In this case, the signal light is Raman-amplified in the optical fiber transmission line to which the Raman amplification pumping light is supplied, so an effective transmission loss can be decreased, and a loss increase due to the insertion of the dispersion compensator can be compensated.

In the optical transmission system according to the present invention, the pumping light supply means may supply the Raman amplification pumping light, where a plurality of pumping channels included in a wavelength range of 1.2 μm to 1.3 μm are multiplexed, into the optical fiber transmission line. In this case, the signal channels near the wavelength of 1.31 μm, where transmission loss is particularly high, is Raman-amplified, and an effective transmission loss near this wavelength can be decreased.

The optical transmission system according to the present invention may further comprise pumping light supply means for supplying Raman amplification pumping light, which Raman-amplifies the signal light propagating through the dispersion compensating optical fiber as a dispersion compensator, to the dispersion compensating optical fiber. In this case, an effective transmission loss of the dispersion compensating optical fiber can be decreased, and as a result, the loss budget can be increased and the reliability of the system can be improved.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 11 is a diagram depicting the configuration of the fourth embodiment of the optical transmission system according to the present invention.

DESCRIPTION OF THE PREFERRED EMBODIMENTS

Figure 1:
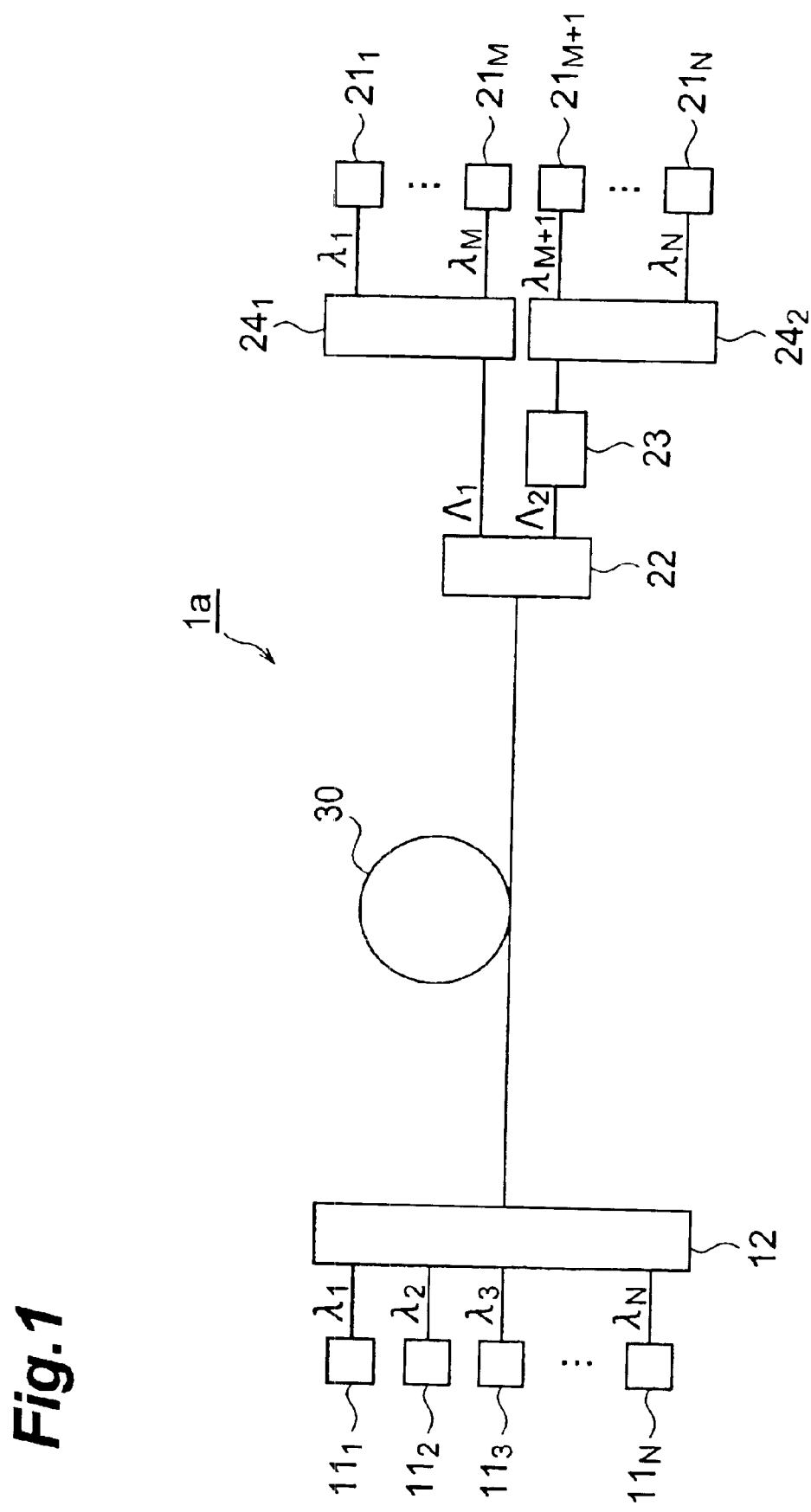
FIG. 1 is a diagram depicting the configuration of the first embodiment of the optical transmission system according to the present invention.

Embodiments of the optical transmission system according to the present invention will now be described in detail with reference to FIGS. 1 to 3, 4A, 4B, 5 to 8, 9A, 9B, 10 and 11. In the descriptions of the drawings, identical composing elements are denoted with identical reference numerals, for which redundant descriptions are omitted.

(First Embodiment)

At first, the first embodiment of the optical transmission system according to the present invention will be described. FIG. 1 is a diagram depicting the configuration of the first embodiment of the optical transmission system according to the present invention. The optical transmission system 1 shown in FIG. 1 comprises N number of (N is an integer 2 or more) direct modulation light sources $11_1$ to $11_N$ (included in the optical transmitter), multiplexer 12, N number of receivers $21_1$ to $21_N$ (included in the optical receiver), demultiplexer 22, dispersion compensator 23, demultiplexer $24_1$, demultiplexer $24_2$ and optical fiber transmission line 30.

Each direct modulation light source $11_n$ (n is an arbitrary integer 1 or more N or less) includes a semiconductor laser light source which outputs light with wavelength $\lambda_n$ (signal channel). The multiplexer 12 multiplexes signal channels with wavelength $\lambda_n$ which are outputted from each direct modulation light source $11_n$, and sends the multiplexed signal light (including the signal channels with wavelengths of $\lambda_1$ to $\lambda_N$) to the optical fiber transmission line 30. The signal channel wavelengths of $\lambda_1$ to $\lambda_N$ are included in the signal wavelength band from about 1.3 µm to about 1.61 µm, and the channel spacing is relatively wide. In other words, this optical transmission system 1 is a system to perform CWDM optical transmission.

The optical fiber transmission line 30 transmits the multiplexed signal light, which is outputted from the multiplexer 12, into the demultiplexer 22. The optical fiber transmission line 30 is preferably a standard single-mode optical fiber having a zero-dispersion wavelength near the wavelength of 1.3 µm, or a non-zero dispersion shifted optical fiber (NZDSF) having a zero-dispersion wavelength which exists in the wavelength range of 1.35 µm to 1.5 µm. It is preferable that the optical fiber transmission line 30, at the wavelength of 1.38 µm, has a transmission loss smaller than a transmission loss at the wavelength of 1.31 µm.

The demultiplexer 22 is disposed in the subsequent stage of the optical fiber transmission line, and demultiplexes the signal channels with wavelengths of $\lambda_1$ to $\lambda_N$, which are included in the multiplexed signal light propagating through the optical fiber transmission line 30, into the signal channel group in the first wavelength $\Lambda_1$ and the signal channel group in the second wavelength band $\Lambda_2$. The first wavelength band $\Lambda_1$ is a wavelength band which includes the zero-dispersion wavelength of the optical fiber transmission line 30, and the second wavelength band $\Lambda_2$ is the other wavelength band. When the optical fiber transmission line 30 is a standard single-mode optical fiber, the second wavelength band $\Lambda_2$ locates at the longer wavelength side from the first wavelength band $\Lambda_1$.

The dispersion compensator 23 dispersion-compensates for the chromatic dispersion of the signal channel group with wavelengths of $\lambda_{M+1}$ to $\lambda_N$ (M is an integer 2 or more (N−1) or less) included in the second wavelength band $\Lambda_2$, which are demultiplexed by the demultiplexer 22. The dispersion compensator 23 has a chromatic dispersion with the opposite sign from the chromatic dispersion of the optical fiber transmission line 30 in the second wavelength band $\Lambda_2$. For the dispersion compensator 23, a dispersion compensating optical fiber, for example, is suitable, and in this case, loss is small, connection with other optical fibers is easy, and use in a wide band is possible. The dispersion compensator 23 may be a bulk type optical device, and in this case the dispersion compensator has periodicity, can be used in a wide band, where dispersion characteristics can be variable, and can be used even at high input power. And the dispersion compensator 23 may be a flat optical guide type optical device, and in this case downsizing is possible, the dispersion compensator 23 can be used in a wide band, and can be used at high input power.

The demultiplexer $24_1$ demultiplexes the signal channels with wavelengths of $\lambda_1$ to $\lambda_M$ included in the first wavelength band $\Lambda_1$, which are demultiplexed by the demultiplexer 22, into each channel wavelength. The demultiplexer $24_2$ inputs the signal channels with wavelengths of $\lambda_{M+1}$ to $\lambda_N$ included in the second wavelength band $\Lambda_2$ for which dispersion is compensated by the dispersion compensator 23, and demultiplexes the signal channels into each channel wavelength. Each receiver $21_n$ receives the signal channel with wavelength $\lambda_n$, which is outputted from the demultiplexer $24_1$ or the demultiplexer $24_2$.

The optical transmission system 1 operates as follows. The signal channels with wavelength $\lambda_n$, which are outputted from the direct modulation light sources $11_n$, are multiplexed by the multiplexer 12, and the multiplexed signal light, including the signal channels with wavelengths of $\lambda_1$ to $\lambda_N$, are sent to the optical fiber transmission line 30. The signal channels with wavelengths of $\lambda_1$ to $\lambda_N$ included in the multiplexed signal light transmitted via the optical fiber transmission line 30 are demultiplexed into the signal channel group in the first wavelength band $\Lambda_1$ and the signal channel group in the second wavelength band $\Lambda_2$ by the demultiplexer 22. The signal channel group with wavelengths of $\lambda_1$ to $\lambda_M$ included in the first wave length band $\Lambda_1$, where the absolute value of the chromatic dispersion is small, which are demultiplexed by the demultiplexer 22, are further demultiplexed into each channel wavelength by the demultiplexer $24_1$, and are received by the receivers $21_1$ to $21_M$ respectively. The signal channel group with wavelengths of $\lambda_{M+1}$ to $\lambda_N$ included in the second wavelength band $\Lambda_2$, where the absolute value of the chromatic dispersion is large, which are demultiplexed by the demultiplexer 22, are dispersion-compensated by the dispersion compensator 23, then demultiplexed into each channel wavelength by the demultiplexer $24_2$, and received by the corresponding receivers $21_{M+1}$ to $21_N$ respectively.

At this time, when the bit rate is B (Gb/s) at a specific wavelength in the second wavelength band $\Lambda_2$ where the total chromatic dispersion becomes highest in the optical fiber transmission line 30 and the dispersion compensator 23, the chromatic dispersion value of this specific wavelength is set to be greater than 0 (ps/nm) but $7500/B^2$ (ps/nm) or less.

Also in the entire system, the loss at each signal channel in the second wavelength band $\Lambda_2$ is set to be lower then the highest loss among the losses of the signal channels in the first wavelength band $\Lambda_1$. Or the lowest received power among the received powers of the receiver for the signal light in the second wavelength band $\Lambda_2$ is set to be higher than the lowest optical power among the optical powers of the signal channels in the first wavelength band $\Lambda_1$ of the optical fiber transmission line 30. The total chromatic dispersion in the optical fiber transmission line 30 and the dispersion compensator 23 is preferably greater than 0 (ps/nm) but $7500/B^2$ (ps/nm) or less in the signal channels in the second wavelength band $\Lambda_2$, respectively. "$7500/B^2$" indicates the dispersion resistance of the system.

By setting the chromatic dispersion characteristics and the loss characteristics as above, the optical transmission system 1 allows high quality transmission of signal light where a plurality of signal channels included in the signal wavelength band are multiplexed, and becomes a configuration particularly suitable for CWDM optical transmission. Also the dispersion compensator 23 is disposed selectively only for the signal channels in the second wavelength band $\Lambda_2$, so system cost decreases. Also the channel spacing in the signal light is wide in CWDM optical transmission, so an inexpensive optical filter can be used for the demultiplexer 22.

Figure 2:
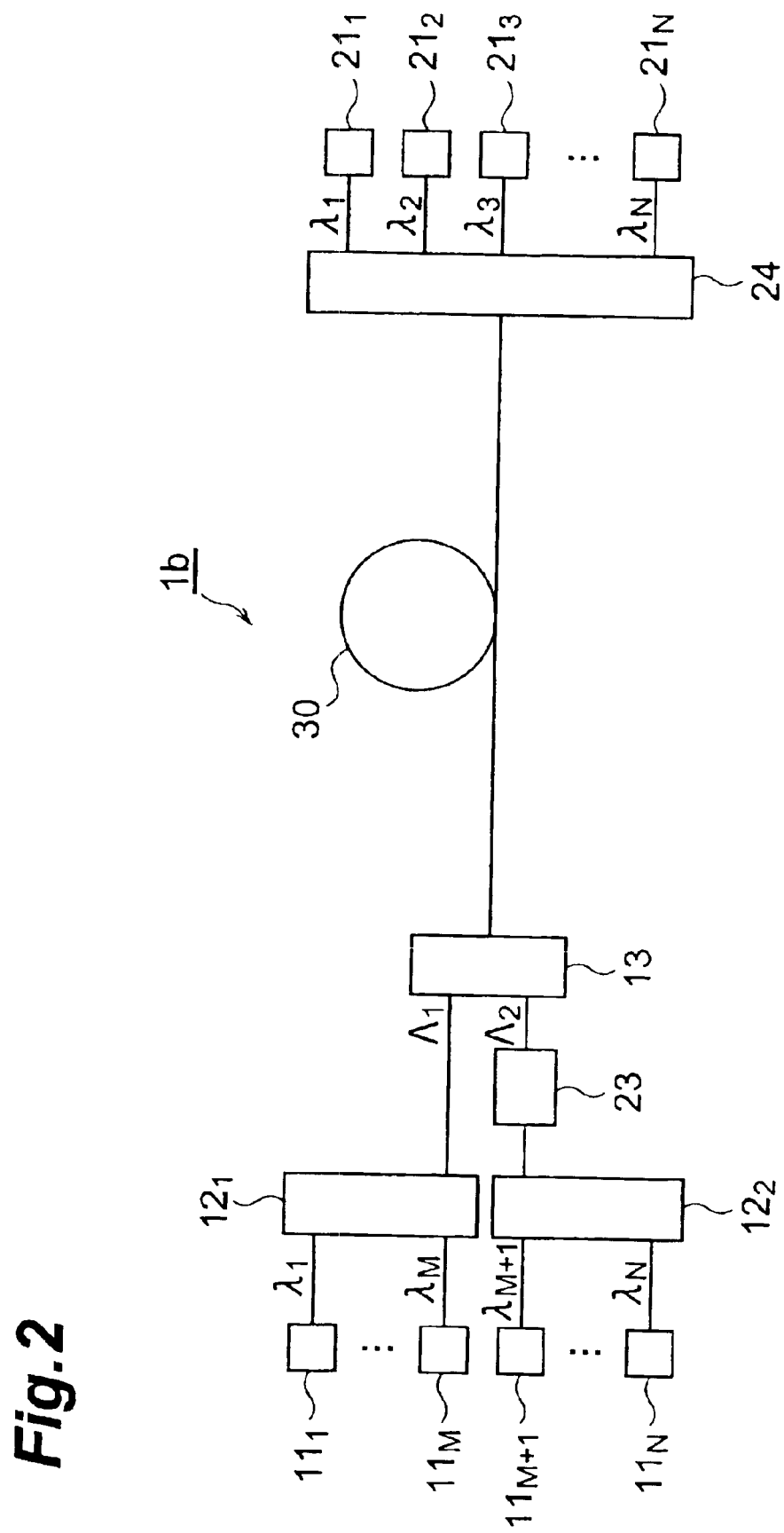
FIG. 2 is a diagram depicting the configuration of the first application example of the optical transmission system according to the first embodiment shown in FIG. 1.

In the above mentioned configuration, the dispersion compensator 23 is disposed at the signal emitting end side of the optical fiber transmission line 30, but the dispersion compensator 23 may be disposed at the signal entering end side of the optical fiber transmission line 30, as shown in FIG. 2. FIG. 2 is a diagram depicting the configuration of the first application example of the optical transmission system 1a according to the first embodiment shown in FIG. 1.

In the optical transmission system 1b according to the first application example, the signal channels with wavelengths of $\lambda_1$ to $\lambda_M$ included in the first wavelength band $\Lambda_1$, which are outputted from the direct modulation light sources $11_1$ to $11_M$, are multiplexed by the multiplexer $12_1$. The signal channels with wavelengths of $\lambda_{M+1}$ to $\lambda_N$ included in the second wavelength band $\Lambda_2$, which are outputted from the direct modulation light sources $11_{M+1}$ to $11_N$, are multiplexed by the multiplexer $12_2$.

The signal channel group included in the second wavelength band $\Lambda_2$ is dispersion-compensated by the dispersion compensator 23, then is multiplexed by the multiplexer 13 along with the signal channel group included in the first wavelength band $\Lambda_1$. The multiplexed signal light, including the signal channels with wavelengths of $\lambda_1$ to $\lambda_N$, which are multiplexed by this multiplexer 13, propagates through the optical fiber transmission line 30, which is constituted by a single-mode optical fiber with a length of 100 km, for example, and reaches the demultiplexer 24.

The multiplexed signal light which reaches the demultiplexer 24 is demultiplexed into each signal channel by the demultiplexer 24, and each signal channel is received by the receivers $21_1$ to $21_N$ respectively, which are disposed corresponding to each signal channel.

Figure 3:
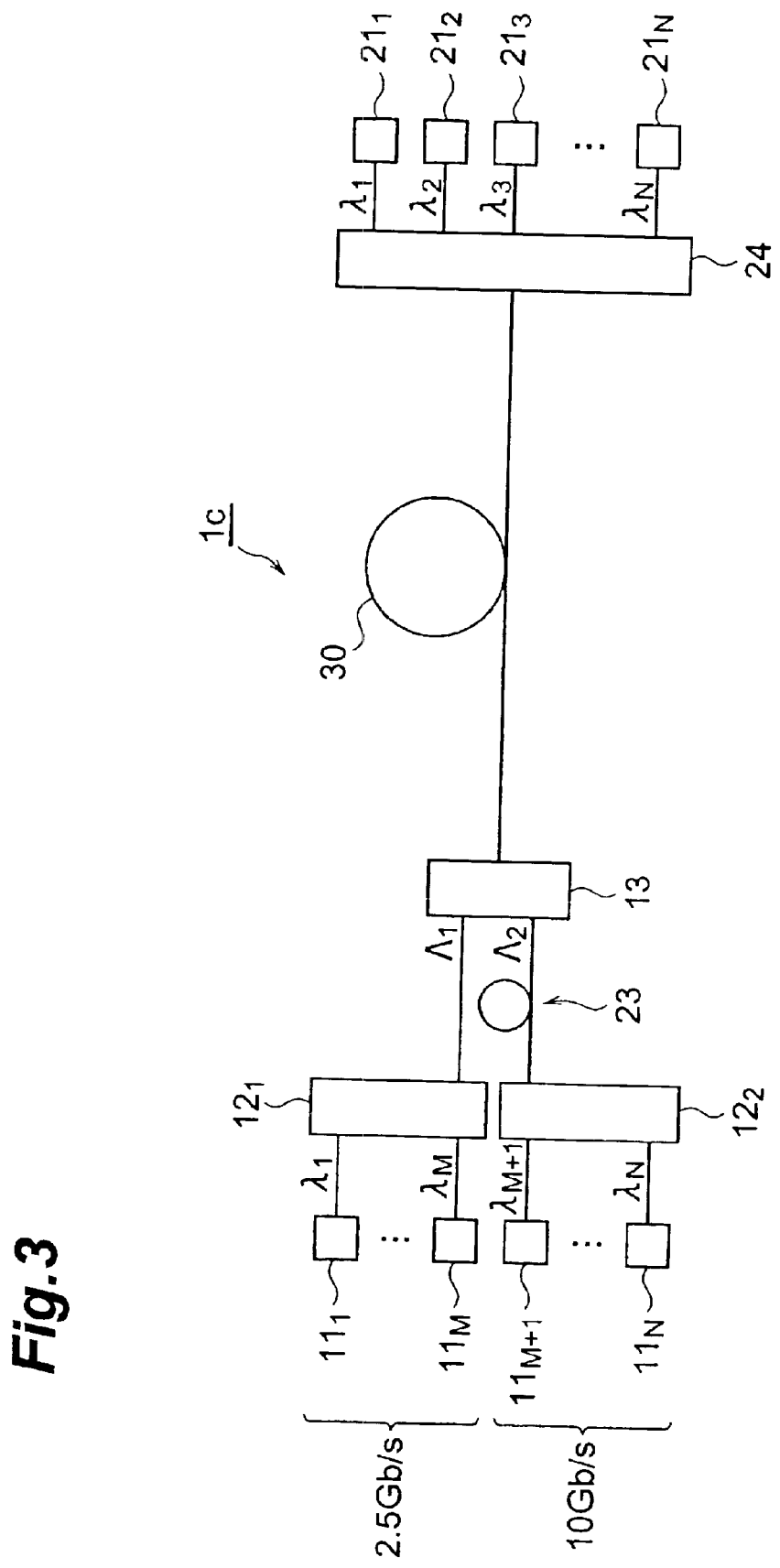
FIG. 3 is a diagram depicting the configuration of the second application example of the optical transmission system according to the first embodiment shown in FIG. 1.

The optical transmission system according to the first embodiment can also perform hybrid transmission for a plurality of signal channels with different transmission speeds. FIG. 3 is a diagram depicting the configuration of the second application example of the optical transmission system according to the first embodiment shown in FIG. 1, and has basically a configuration similar to the optical transmission system 1b according to the first application example shown in FIG. 2.

In the optical transmission system 1c according to the second application example, the transmission speed of the signal channels with wavelengths of $\lambda_1$ to $\lambda_M$, which are outputted from the direct modulation light sources $11_1$ to $11_M$, is 2.5 Gb/s, while the transmission speed of the signal channels with wavelengths of $\lambda_{M+1}$ to $\lambda_N$, which are outputted from the direct modulation light sources $11_{M+1}$ to $11_N$, is 10 Gb/s. In this optical transmission system 1c, a signal channel with a high bit rate (10 Gb/s) is dispersion-compensated by the dispersion compensator 23, which is a dispersion compensating optical fiber (DCF).

For example, in the optical transmission system 1c, signal channels within the range of 1490 nm to 1550 nm from the direct modulation light sources $11_1$ to $11_M$ are multiplexed by the multiplexer $12_1$ as a signal channel group in the first wavelength band $\Lambda_1$, where the transmission speed is 2.5 Gb/s. As the signal channel group in the second wavelength band $\Lambda_2$, where the transmission speed is 10 Gb/s, on the other hand, the signal channels with wavelengths 1570 nm and 1590 nm from the direct modulation light sources $11_{M+1}$ to $11_N$ are multiplexed by the multiplexer $12_2$. The signal channel group in the second wavelength band $\Lambda_2$ is further dispersion-compensated by the DCF 23, and chromatic dispersion is decreased until residual dispersion becomes less than 10 ps/nm. Then the signal channel group in the second wavelength band $\Lambda_2$ is multiplexed by the multiplexer 13 along with the signal channel group in the first wavelength band $\Lambda_1$. The multiplexed signal light, including the signal channels within the wavelength range of 1490 nm to 1590 nm, which are outputted from the multiplexer 13, propagates through the optical fiber transmission line 30 (e.g. a single-mode optical fiber with a length of 50 km), and reaches the demultiplexer 24. In this demultiplexer 24, the multiplexed signal light is demultiplexed into signal channels, which are received by the receivers $21_1$ to $21_N$ corresponding to these signal channels, respectively.

When upgradeable signal channels are determined in advance and dispersion compensation is performed for the signal channels by the dispersion compensator, such as DCF, as shown in this optical transmission system 1C, then the transmission speed can be easily upgraded from 2.5 Gb/s to 10 Gb/s merely by switching the optical transmitter and the optical receiver.

Figure 4A:
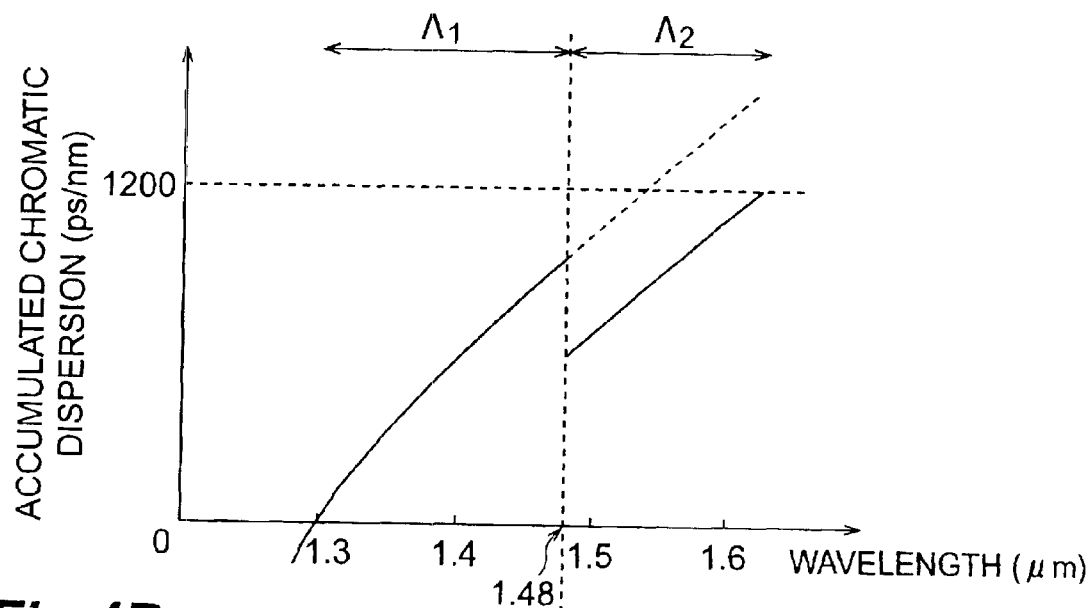
FIGS. 4A and 4B are graphs depicting the chromatic dispersion characteristics and the loss characteristics of the optical transmission system according to the first embodiment shown in FIG. 1.
Figure 4B:
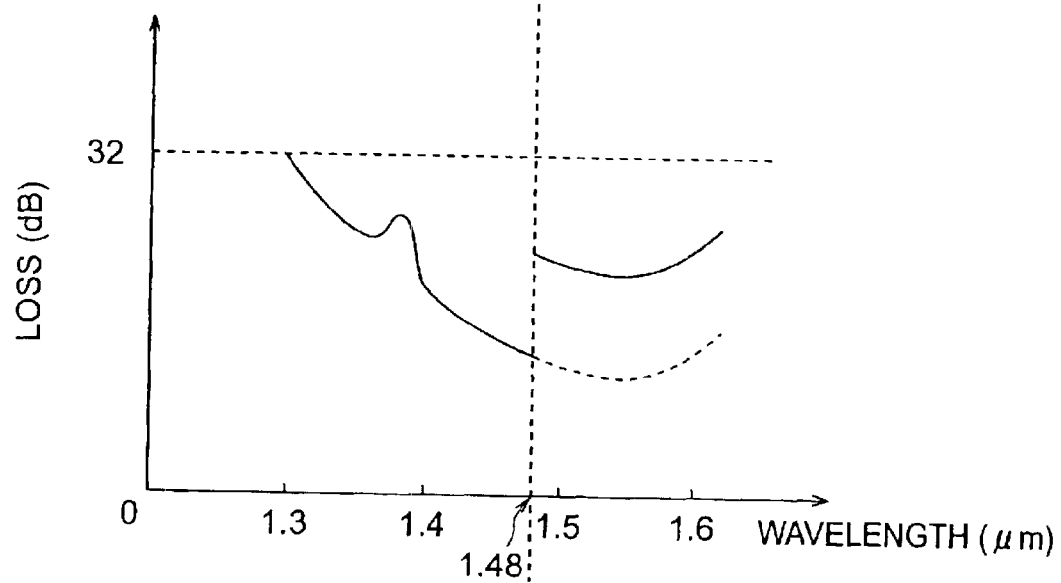

FIGS. 4A and 4B are graphs depicting the chromatic dispersion characteristics and the loss characteristics of the optical transmission system 1 according to the first embodiment. FIG. 4A shows the dependency of accumulated chromatic dispersion on wavelength from the transmitter to the receiver, and FIG. 4B shows the dependency of loss on wavelength from the transmitter to the receiver. The optical fiber transmission line 30 is assumed to be a standard single-mode optical fiber with a length of 80 km. The dispersion compensator 23 is a dispersion compensating optical fiber having a chromatic dispersion of −100 ps/nm/km, a dispersion slope of 0 ps/nm²/km, and a transmission loss of 0.5 dB/km, as characteristics at wavelength 1.55 μm. The insertion loss of the multiplexer 12, demultiplexer $24_1$ and demultiplexer $24_2$ is 3 dB, respectively. The insertion loss of the demultiplexer 22 is 1 dB. The 16-channel signal light (channel spacing 20 nm) in the wavelength range of 1.31 μm to 1.61 μm are transmitted at a bit rate of 2.5 Gb/s. In this case, the dispersion resistance of the system is 1200 ps/nm.

When the dispersion compensator 23 is not disposed, the accumulated chromatic dispersion exceeds the dispersion resistance depending on the wavelength (broken line in FIG. 4A). However in the optical transmission system 1 according to the first embodiment, each signal channel included in the second wave band $\Lambda_2$ (wavelength range of 1.48 μm to 1.61 μm), where the absolute value of chromatic dispersion in the optical fiber transmission line 30 is large, is dispersion-compensated by the dispersion compensator 23, so the accumulated chromatic dispersion of the entire system is the dispersion resistance or less (solid line in FIG. 4A). The length of the dispersion compensating optical fiber, which is the dispersion compensator 23, is adjusted such that the accumulated chromatic dispersion becomes the dispersion resistance or less at maximum wavelength 1.61 μm.

The loss of the dispersion compensator 23 is 3 dB. The highest loss in the first wavelength band $\Lambda_1$ is 32 dB at wavelength 1.31 μm, and the loss in the entire second wavelength band $\Lambda_2$ is 29 dB to 30 dB (FIG. 4B). When the accumulated chromatic dispersion in the entire second wavelength band $\Lambda_2$ attempts to be negative, the loss in the entire second wavelength band $\Lambda_2$ becomes higher than the loss at wavelength 1.31 μm.

Figure 5:
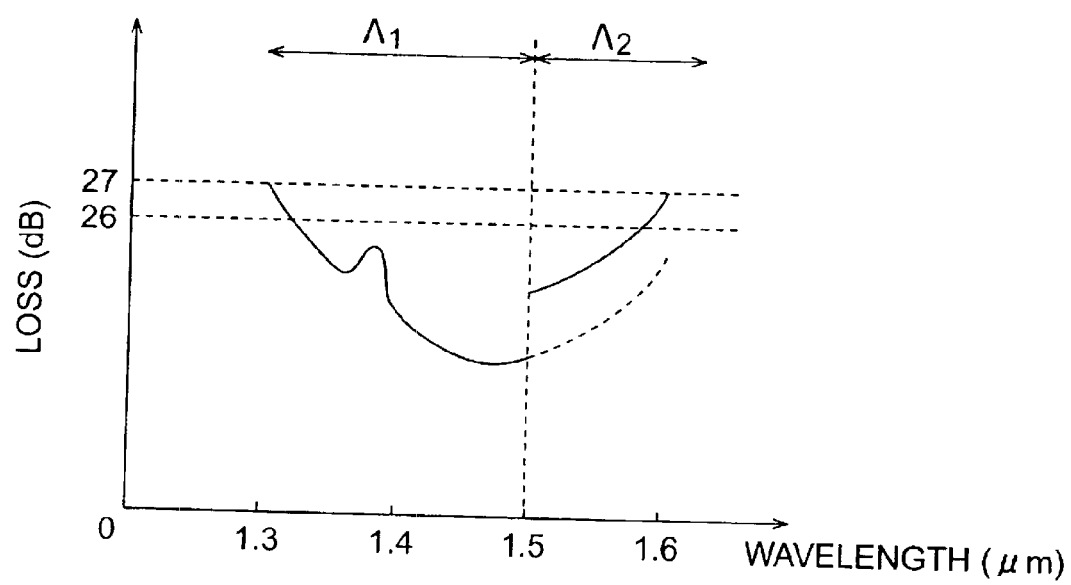
FIG. 5 is a graph showing the loss characteristics of the optical transmission system according to the first embodiment shown in FIG. 1.

FIG. 5 is a graph depicting other loss characteristics of the optical transmission system 1 according to the first embodiment. FIG. 5 shows the dependency of loss on wavelength from the transmitter to the receiver. Here the optical fiber transmission line 30 is assumed to be a non-zero dispersion shifted optical fiber (NZDSF) with a length of 70 km. This non-zero dispersion shifted optical fiber has a zero-dispersion wavelength of 1.48 μm and a transmission loss of 0.2 dB/km at a wavelength of 1.55 μm. The dispersion compensator 23 is a dispersion compensating optical fiber having a chromatic dispersion of −80 ps/nm/km, a dispersion slope of 0.1 ps/nm²/km, and a transmission loss of 0.5 dB/km, as characteristics at wavelength 1.55 μm. The insertion loss of the multiplexer 12, demultiplexer $24_1$ and demultiplexer $24_2$ is 3 dB respectively. The insertion loss of the demultiplexer 22 is 1 dB. The 16-channel signal light (channel spacing 20 nm) in the wavelength range of 1.31 μm to 1.61 μm are transmitted at a bit rate 10 Gb/s. In this case, the dispersion resistance of the system is 75 ps/nm.

In this case as well, when the dispersion compensator 23 is not disposed, the accumulated chromatic dispersion exceeds the dispersion resistance depending on the wavelength. However in the optical transmission system 1 according to the first embodiment, each signal channel included in the second wavelength band $\Lambda_2$ (wavelengths of 1.5 μm to 1.61 μm), where the absolute value of chromatic dispersion in the optical fiber transmission line 30 is large, is dispersion-compensated by the dispersion compensator 23, so the accumulated chromatic dispersion of the entire system is less than the dispersion resistance. The length of the dispersion compensating optical fiber, which is the dispersion compensator 23, is adjusted such that the accumulated chromatic dispersion at maximum wavelength 1.61 μm becomes the dispersion resistance or less. The highest loss in the first wavelength band $\Lambda_1$ is 27 dB at wavelength 1.31 μm, and the loss in the entire second wavelength band $\Lambda_2$ is 26 dB or less. The transmission penalty is 1 dB or less at all the wavelengths.

Figure 6:
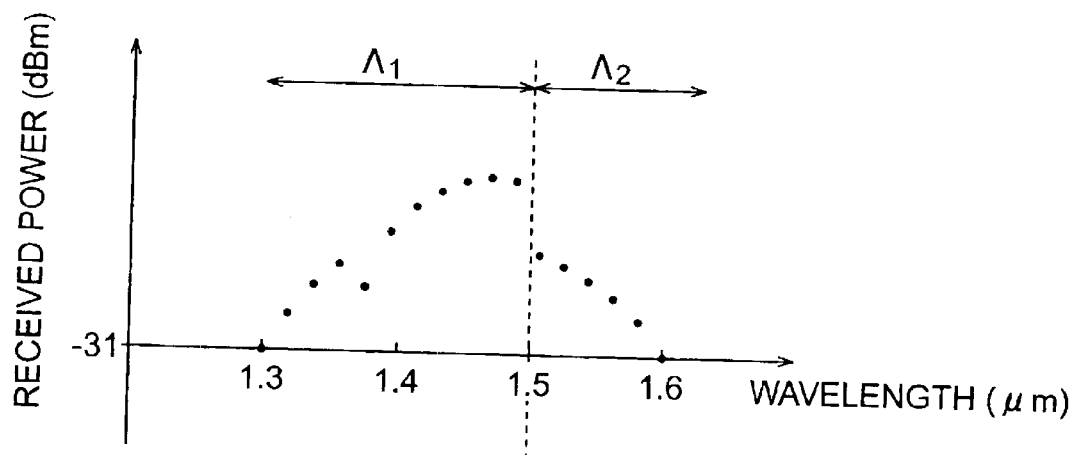
FIG. 6 is a diagram plotting the received power (input power to the receiver) for each channel in the optical transmission system according to the first embodiment shown in FIG. 1.

FIG. 6 is a diagram plotting the received power (input power to the receiver) for each signal channel in the optical transmission system according to the first embodiment shown in FIG. 1. The optical transmission line 30 is assumed to be a standard single-mode optical fiber with a length of 80 km. The dispersion compensator 23 is a dispersion compensating optical fiber having a chromatic dispersion of −100 ps/nm/km, a dispersion slope of 0 ps/nm²/km and a transmission loss of 0.5 dB/km, as characteristics at wavelength 1.55 μm. The insertion loss of the multiplexer 12, demultiplexer $24_1$ and demultiplexer $24_2$ is 3 dB, respectively. The insertion loss of the demultiplexer 22 is 1 dB. The 16-channel signal light (channel spacing 20 nm) in the wavelength range of 1.31 μm to 1.61 μm are transmitted at a bit rate of 2.5 Gb/s.

In this system configuration, it was confirmed that the lowest received power in the receivers $21_1$ to $21_N$ is −31 dB or more, and is BER is <$10^{-11}$ in all the signal channels.

(Second Embodiment)

Figure 7:
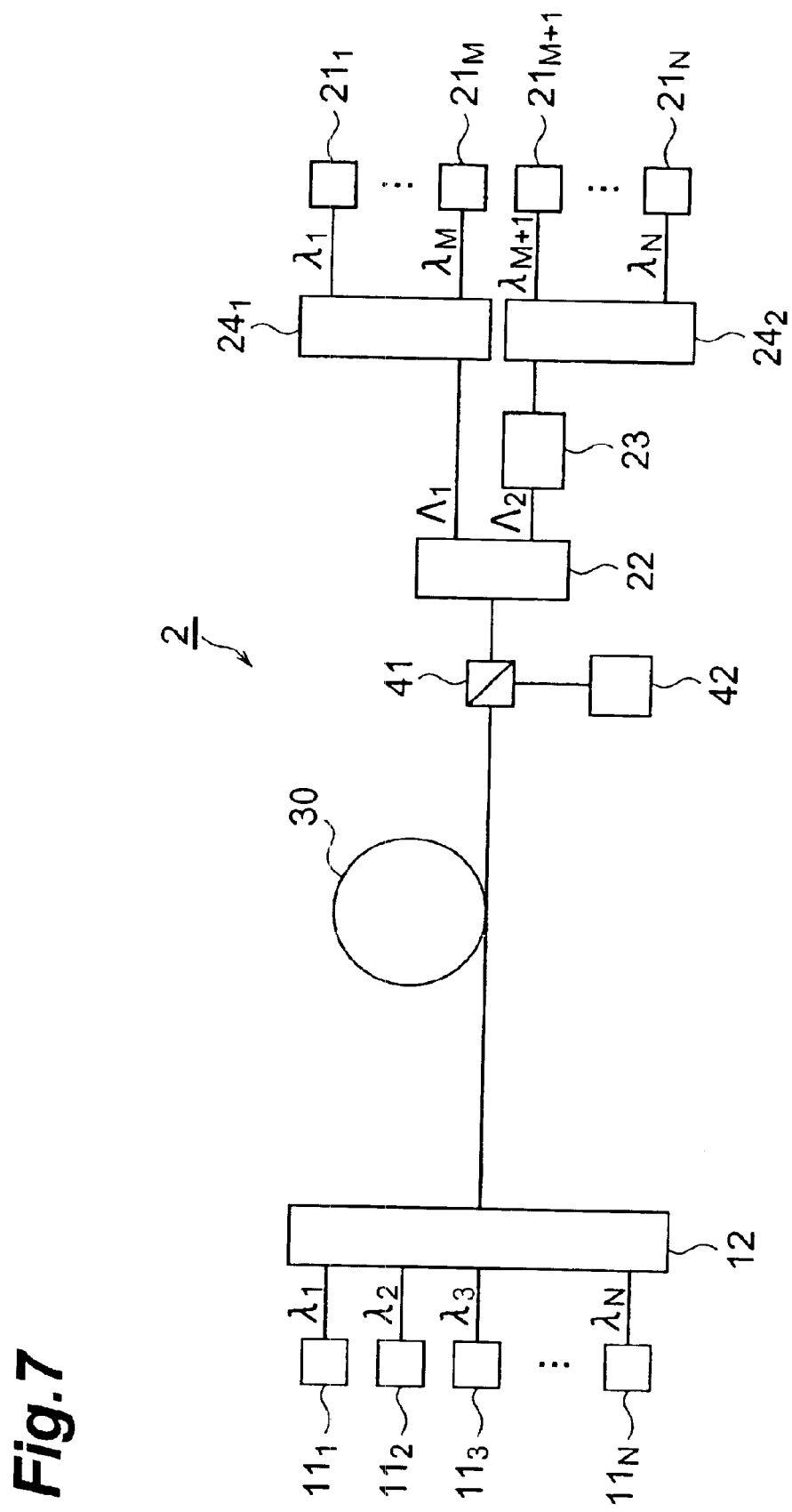
FIG. 7 is a diagram depicting the configuration of the second embodiment of the optical transmission system according to the present invention.

Now the second embodiment of the optical transmission system according to the present invention will be described. FIG. 7 is a diagram depicting the configuration of the optical transmission system according to the present invention. The optical transmission system 2 shown in FIG. 7 further comprises an optical coupler 41 and an pumping light source 42, in addition to the configuration of the optical transmission system 1 according to the first embodiment (FIG. 1). In the following description, the dispersion compensator 23 is disposed at the signal emitting end side of the optical fiber transmission line 30, as shown in FIG. 7, but in the second embodiment, the dispersion compensator 23 may be disposed at the signal entering end side of the optical fiber transmission line 30, as shown in FIG. 2, as an application example, or the dispersion compensator 23 may be disposed in the middle of the optical fiber transmission line 30. This second embodiment may have a configuration which allows hybrid transmission, where the transmission speed is different among the signal channels, as shown in FIG. 3, as another application example.

The pumping light source 42 outputs the Raman amplification pumping light, which Raman-amplifies the multiplexed signal light, in the optical fiber transmission line 30. The optical coupler 41 is disposed in the subsequent stage of the optical fiber transmission line 30 and in the previous stage of the demultiplexer 22, and supplies the pumping light, which is outputted from the pumping light source 42, to the optical fiber transmission line 30, and also outputs the multiplexed signal light propagating through the optical fiber transmission line 30 to the multiplexer 22. It is preferable that the Raman amplification pumping light includes a plurality of pumping channels in the wavelength range of 1.2 μm to 1.3 μm, and in this case, the multiplexed signal light in the wavelength range of 1.3 μm to 1.4 μm can be Raman-amplified. At this time, it is preferable that the optical fiber transmission line 30 has a transmission loss at wavelength 1.38 μm, which is smaller than the transmission loss at wavelength 1.31 μm.

This optical transmission system 2 operates as follows. The Raman amplification pumping light, which is outputted from the pumping light source 42, is supplied to the optical fiber transmission line 30 via the optical coupler 41. The signal channels with wavelength $\lambda_n$, which are outputted from the direct modulation light sources $11_n$, are multiplexed by the multiplexer 12, and the multiplexed signal light, which includes the signal light with wavelengths of $\lambda_1$ to $\lambda_N$, is sent to the optical fiber transmission line 30. While being transmitted via the optical fiber transmission line 30, the multiplexed signal light is Raman-amplified. And the signal channels with wavelengths of $\lambda_1$ to $\lambda_N$, included in the multiplexed signal light, which reaches the demultiplexer 22 via the optical coupler 41, are demultiplexed into the signal channel group in the first wavelength band $\Lambda_1$ and the signal channel group in the second wavelength band $\Lambda_2$ by the demultiplexer 22. The signal channel group with wavelengths of $\Lambda_1$ to $\lambda_M$ included in the first wavelength band $\Lambda_1$, where the absolute value of chromatic dispersion is small, demultiplexed by the demultiplexer 22, is demultiplexed into each signal channel by the demultiplexer $24_1$, and each signal channel is received by the corresponding receivers $21_1$ to $21_M$ respectively. The signal channel group with wavelengths of $\lambda_{M+1}$ to $\lambda_N$ included in the second wavelength band $\Lambda_2$, where the absolute value of chromatic dispersion is large, demultiplexed by the demultiplexer 22, is demultiplexed into each signal channel after dispersion is compensated by the dispersion compensator 23, and each signal channel is received by the corresponding receivers $21_{M+1}$ to $21_N$, respectively.

At this time, when the bit rate is B (Gb/s) at a specific wavelength in the second wavelength band $\Lambda_2$ where the total chromatic dispersion becomes highest in the optical fiber transmission line 30 and the dispersion compensator 23, the chromatic dispersion value of this specific wavelength is set to be greater than 0 (ps/nm) but $7500/B^2$ (ps/nm) or less.

Also in the entire system, the loss at each signal channel in the second wavelength band $\Lambda_2$ is set to be lower than the highest loss among losses of the signal channels in the first wavelength band $\Lambda_1$. Or the lowest received power among the received powers of the receiver for each signal channel in the second wavelength band $\Lambda_2$ is set to be higher than the lowest optical power among the optical powers of the signal channels in the first wavelength band $\Lambda_1$ of the optical fiber transmission line 30. It is preferable that the total chromatic dispersion in the optical fiber transmission line 30 and the dispersion compensator 23 is set to be greater than 0 (ps/nm) but $7500/B^2$ (ps/nm) or less in each signal channel in the second wavelength band $\Lambda_2$ respectively.

By setting the chromatic dispersion characteristics and the loss characteristics as above, the optical transmission system 2 allows high quality transmission of the multiplexed signal light including a plurality of signal channels in the signal wavelength band, and becomes a configuration particularly suitable for CWDM optical transmission. Also the dispersion compensator 23 is disposed selectively only for the signal channels in the second wavelength band $\Lambda_2$, so system cost decreases. Also the signal channel spacing is wide in the CWDM optical transmission, so an inexpensive optical filter can be used for the demultiplexer 22. Also according to the second embodiment, higher quality signal light transmission is possible by Raman-amplifying the signal channel group in a wavelength band where loss of the optical fiber transmission line 30 is high.

In particular, the optical fiber transmission line 30 is assumed to be a non-zero dispersion shifted optical fiber having a loss peak due to an OH—radical near the wavelength of 1.38 μm is decreased. The 16-channel signal light (channel spacing 20 nm) in wavelength range of 1.31 μm to 1.61 μm are transmitted at a bit rate 2.5 Gb/s. In this case, the dispersion resistance of the system is 1200 ps/nm. The wavelength of each pumping channel included in the Raman amplification pumping light is 1.2 μm to 1.3 μm, and the multiplexed signal light near the wavelength of 1.3 μm is Raman-amplified. By this, the transmission distance which is restricted by loss is expanded, or received power increases, and the system margin can be expanded.

For example, when the wavelength of the Raman amplification pumping light is 1.23 μm and the power is 24 dBm the transmission distance at wavelength 1.33 μm can be 20 km or more longer.

(Third Embodiment)

Figure 8:
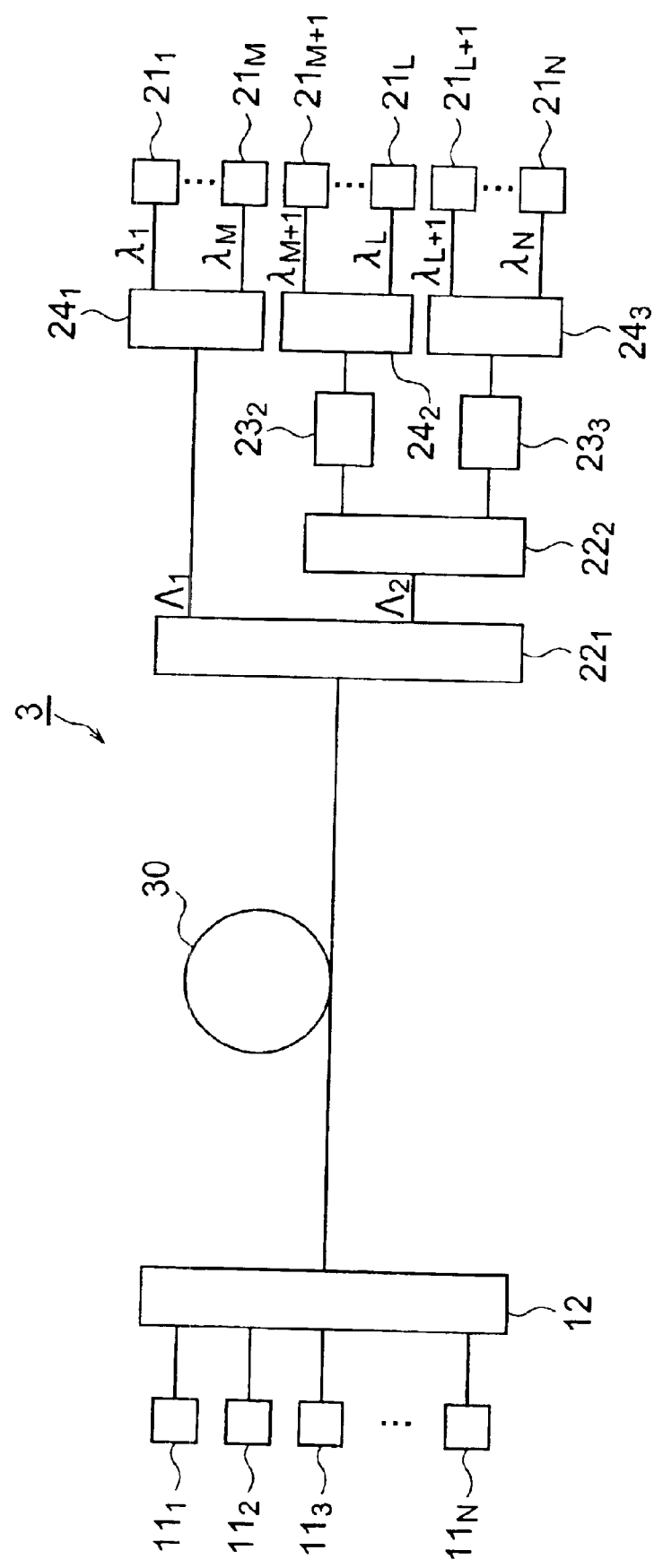
FIG. 8 is a diagram depicting the configuration of the third embodiment of the optical transmission system according to the present invention.

The third embodiment of the optical transmission system according to the present invention will now be described. FIG. 8 is a diagram depicting the configuration of the third embodiment of the optical transmission system according to the present invention. The optical transmission system 3 shown in FIG. 8 comprises N number of (N is an integer 2 or more) direct modulation light sources $11_1$ to $11_N$ (included in the optical transmitter), multiplexer 12, N number of receivers $21_1$ to $21_N$, demultiplexer $22_1$, demultiplexer $22_2$, dispersion compensator $23_2$, dispersion compensator $23_3$, demultiplexer $24_1$, demultiplexer $24_2$, demultiplexer $24_3$, and optical fiber transmission line 30. The following description is based on the configuration where the dispersion compensator 23 is disposed at the signal emitting end side of the optical fiber transmission line 30, as shown in FIG. 8, but in the third embodiment, the dispersion compensator 23 may be disposed at the signal entering end side of the optical fiber transmission line 30, as shown in FIG. 2 as an application example, or the dispersion compensator 23 may be disposed in the middle of the optical fiber transmission line 30. Also in the third embodiment, a configuration which allows hybrid transmission, where the transmission speed is different among signal channels, as shown in FIG. 3, may be used as another application example.

The direct modulation light sources $11_n$ (n is an arbitrary integer 1 or more N or less) includes a semiconductor laser light source which outputs the signal channels with wavelength of $\lambda_n$. The multiplexer 12 multiplexes the signal channels with wavelength $\lambda_n$ which are outputted from the direct modulation light source $11_n$, and sends the multiplexed signal light (including signal channels with wavelengths of $\lambda_1$ to $\lambda_N$) to the optical fiber transmission line 30. These signal channel wavelengths of $\lambda_1$ to $\lambda_N$ are included in the signal wavelength band from a wavelength of about 1.3 μm to a wavelength of about 1.61 μm, of which the channel spacing is relatively wide. In other words, the optical transmission system 3 is a system which performs CWDM optical transmission.

The optical fiber transmission line 30 transmits the signal light, including the signal channels with wavelengths of $\lambda_1$ to $\lambda_N$, which are outputted from the multiplexer 12, to the demultiplexer $22_1$. It is preferable that this optical fiber transmission line 30 is a standard single-mode optical fiber having a zero-dispersion wavelength near the wavelength of 1.3 μm, or a non-zero dispersion shifted optical fiber having a zero-dispersion wavelength within the range of 1.35 μm to 1.5 μm. It is also preferable that the optical fiber transmission line 30, at the wavelength of 1.38 μm, has a transmission loss smaller than a transmission loss at the wavelength of 1.31 μm.

The demultiplexer $22_1$ is disposed in the subsequent stage of the optical fiber transmission line 30, and demultiplexes the signal channels with wavelengths of $\lambda_1$ to $\lambda_N$ included in the multiplexed signal light, which propagates through the optical fiber transmission line 30, into the signal channel group in the first wavelength band $\Lambda_1$ and the signal channel group in the second wavelength band $\Lambda_2$. The first wavelength band $\Lambda_1$ is a wavelength band which includes the zero-dispersion wavelength of the optical fiber transmission line 30, and the second wavelength band $\Lambda_2$ is the other wavelength band. When the optical fiber transmission line 30 is a standard single-mode optical fiber, the second wavelength band $\Lambda_2$ is at the longer wavelength side from the first wavelength band $\Lambda_1$. The demultiplexer $22_2$ further demultiplexes the signal channel group with wavelengths of $\lambda_{M+1}$ to $\lambda_N$ (M is an integer 2 or more (N−1) or less) included in the second wavelength band $\Lambda_2$ demultiplexed by the demultiplexer $22_1$ into two wavelength bands.

The dispersion compensator $23_2$ dispersion-compensates for the signal channel group with wavelengths of $\lambda_{M+1}$ to $\lambda_L$ (L is an integer (M+2) or more (N−1) or less) among the signal channel group in the second wavelength band $\Lambda_2$ demultiplexed by the demultiplexer $22_2$. The dispersion compensator $23_3$ dispersion-compensates for the signal channel group with wavelengths of $\lambda_{L+1}$ to $\lambda_N$ among the signal channel group in the second wavelength band $\Lambda_2$ demultiplexed by the demultiplexer $22_3$. These dispersion compensators $23_2$ and $23_3$ have chromatic dispersion with the opposite sign from the chromatic dispersion with the optical fiber transmission line 30 in each wavelength band, and a dispersion compensating optical fiber, for example, is suitable.

The demultiplexer $24_1$ demultiplexes the signal channel group with wavelengths of $\lambda_1$ to $\lambda_M$ included in the first wavelength band $\Lambda_1$, which are demultiplexed by the demultiplexer $22_1$, into each signal channel. The demultiplexer $24_2$ demultiplexes the signal channels with wavelengths of $\lambda_{M+1}$ to $\lambda_L$ among the signal channels in the second wavelength band $\Lambda_2$, for which dispersion is compensated by the dispersion compensator $23_2$ into each signal channel. The demultiplexer $24_3$ demultiplexes the signal channel group with wavelengths of $\lambda_{L+1}$ to $\lambda_N$, for which dispersion is compensated by the dispersion compensator $23_3$, into each signal channel. The receiver $21_n$ receives the signal channel with wavelength $\lambda_n$, which is demultiplexed by one of the demultiplexers $24_1$ to $24_3$, respectively.

This optical transmission system 3 operates as follows. The signal channels with wavelength $\lambda_n$, which are outputted from the direct modulation light source $11_n$, are multiplexed by the multiplexer 12, and the multiplexed signal light including the signal channels with wavelengths of $\lambda_1$ to $\lambda_N$ are sent to the optical fiber transmission line 30. The signal channels with wavelengths of $\lambda_1$ to $\lambda_N$ included in the multiplexed signal light, which reached the demultiplexer $22_1$ via the optical fiber transmission line 30, are demultiplexed into the signal channel group in the first wavelength band $\Lambda_1$ and the signal channel group in the second wavelength band $\Lambda_2$ by the demultiplexer $22_1$. The signal channel group with the wavelengths of $\lambda_1$ to $\lambda_M$ included in the first wavelength band $\Lambda_1$, where the absolute value of chromatic dispersion is small, demultiplexed by the demultiplexer $22_1$, are demultiplexed into each signal channel by the demultiplexer $24_1$, and received by the receivers $21_1$ to $21_M$, which each signal channel corresponds to, respectively. The signal channel group with wavelengths of $\lambda_{M+1}$ to $\lambda_N$ included in the second wavelength band $\Lambda_2$, where the absolute value of chromatic dispersion is large, demultiplexed by the demultiplexer $22_1$, on the other hand, are further demultiplexed into two wavelength bands by the demultiplexer $22_2$, dispersion is compensated by the dispersion compensators $23_2$ and $23_3$, and then demultiplexed into each signal channel by the demultiplexers $24_2$ and $24_3$, then each signal channel is received by the corresponding receiver $21_{N+1}$ to $21_N$, respectively.

At this time, when the bit rate is B (Gb/s) at a specific wavelength in the second wavelength band $\Lambda_2$ where the total chromatic dispersion becomes highest in the optical fiber transmission line 30 and the dispersion compensator 23, the chromatic dispersion value with this specific wavelength is greater than 0 (ps/nm) but $7500/B^2$ (ps/nm) or less.

Also in the entire system, the loss at each signal channel in the second wavelength band $\Lambda_2$ is set to be lower than the highest loss among losses of the signal channels in the first wavelength band $\Lambda_1$. Or the lowest received power among the received powers of the receiver for signal channels in the second wavelength band $\Lambda_2$ is set to be higher than the lowest optical power among the optical powers of the signal channels in the first wavelength band $\Lambda_1$ of the optical fiber transmission line 30. It is preferable that the total chromatic dispersion in the optical fiber transmission line 30 and the dispersion compensator 23 is set to be greater than 0 (ps/nm) but $7500/B^2$ (ps/nm) or less in each signal channel in the second wavelength band $\Lambda_2$ respectively.

By setting the chromatic dispersion characteristics and the loss characteristics as above, the optical transmission system 3 allows high quality transmission of multiplexed signal light including a plurality of signal channels in the signal wavelength band, and becomes a configuration particularly suitable for CWDM optical transmission. Also the dispersion compensators $23_2$ and $23_3$ are disposed selectively only for the signal channel group in the second wavelength band $\Lambda_2$, so system cost decreases. Also the signal channel spacing is wide in CWDM optical transmission, so an inexpensive optical filter can be used for the demultiplexers $22_1$ and $22_2$. Particularly according to the third embodiment, higher quality signal light transmission is possible because the signal channel group in the second wavelength band $\Lambda_2$ is further demultiplexed into two wavelength bands, and a dispersion compensator is disposed for each wavelength band. Also the loss requirement characteristics for the dispersion compensators $23_2$ and $23_3$ are relaxed, so system design is easy.

Figure 9A:
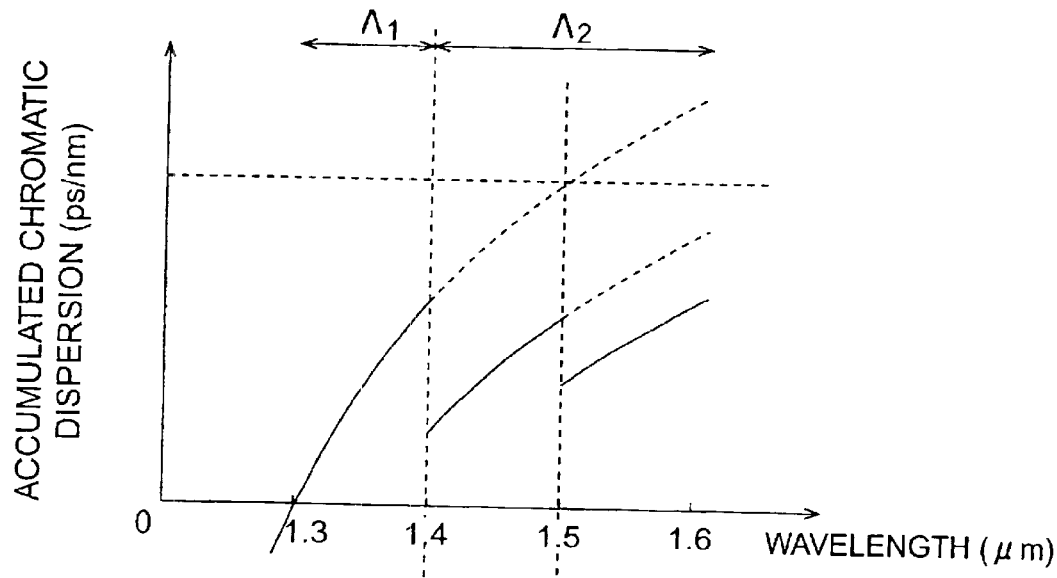
FIGS. 9A and 9B are graphs depicting the chromatic dispersion characteristics and the loss characteristics of the optical transmission system according to the third embodiment shown in FIG. 8.
Figure 9B:
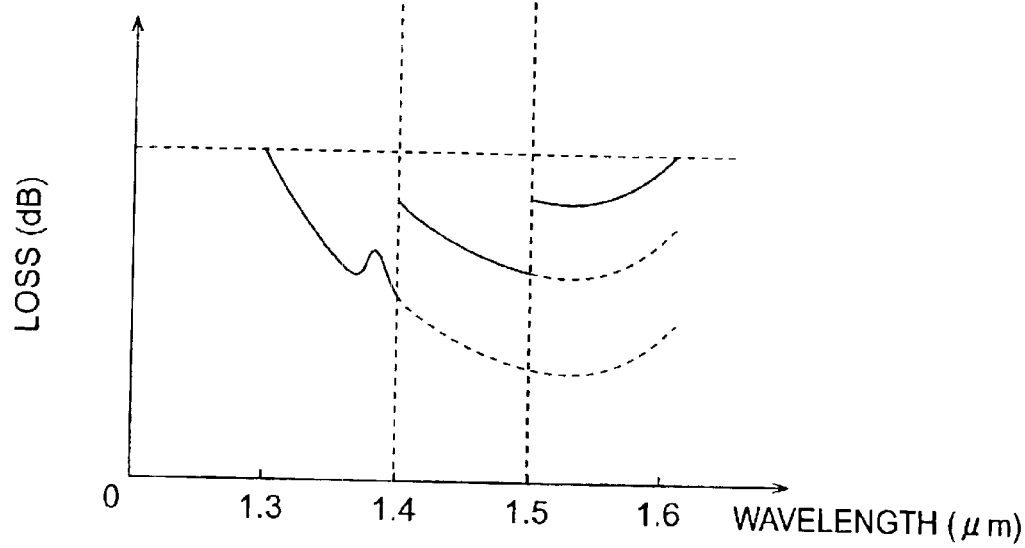

FIGS. 9A and 9B are graphs depicting the chromatic dispersion characteristics and the loss characteristics of the optical transmission system 3 according to the third embodiment. FIG. 9A shows the dependency of accumulated chromatic dispersion on wavelength from the transmitter to the receiver, and FIG. 9B shows the dependency of loss on wavelength from the transmitter to the receiver. When the dispersion compensators $23_2$ and $23_3$ are not disposed, accumulated chromatic dispersion exceeds the dispersion resistancees depending on the wavelength (broken line in FIG. 9A). However in the optical transmission system 3 according to the third embodiment, the signal channel group included in the second wavelength band $\Lambda_2$ (wavelength range of 1.4 μm to 1.61 μm), where the absolute value of chromatic dispersion is large in the optical fiber transmission line 30, is dispersion-compensated by the dispersion compensators $23_2$ to $23_3$, so the accumulated chromatic dispersion of the entire system becomes the dispersion resistance or less (solid line in FIG. 9A). The length of the dispersion compensating optical fibers, which are the dispersion compensators $23_2$ and $23_3$, is adjusted such that the accumulated chromatic dispersion becomes the dispersion resistance or less at the maximum wavelength in each band.

Figure 10:
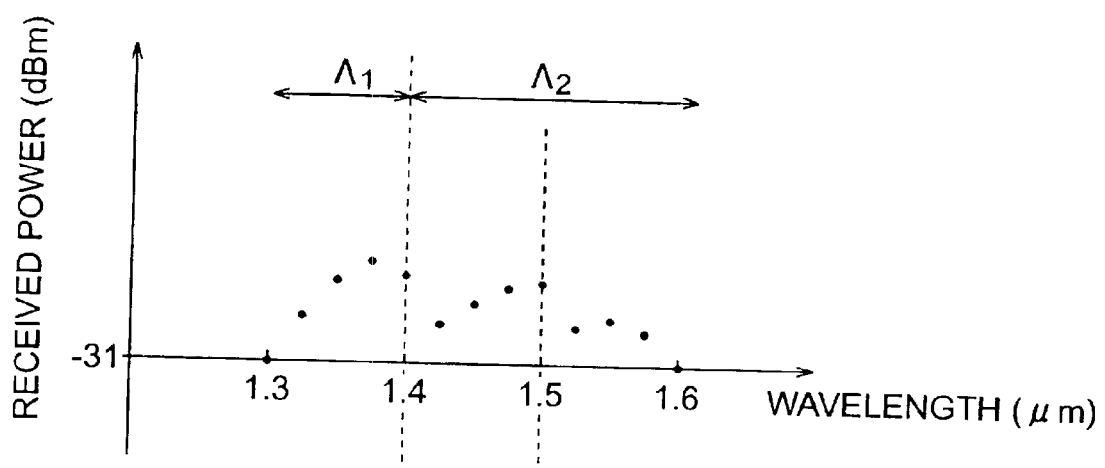
FIG. 10 is a diagram plotting the received power (input power to the receiver) for each signal channel in the optical transmission system according to the third embodiment shown in FIG. 8.

FIG. 10 is a diagram plotting the received power (input power to the receiver) for each channel in the optical transmission system according to the third embodiment shown in FIG. 8. The optical fiber transmission line 30 is assumed to be a standard single mode optical fiber with a length of 80 km. The dispersion compensator 23 is a dispersion compensating optical fiber having a chromatic dispersion of -100 ps/nm/km, a dispersion slope of 0 ps/nm²/km, and a transmission loss of 0.5 dB/km, as characteristics at the wavelength of 1.55 μm. The insertion loss of the multiplexer 12, demultiplexer $24_1$ and demultiplexer $24_2$ is 3 dB, respectively. The insertion loss of the demultiplexer 22 is 1 dB. The 16-channel signal light (channel spacing 20 nm) in the wavelength range of 1.31 μm to 1.61 μm are transmitted at a bit rate 2.5 Gb/s.

It was confirmed that in this system configuration, the lowest received power in the receivers $21_1$ to $21_N$ is -30 dB or more, and BER is $<10^{-13}$ in all the signal channels.

(Fourth Embodiment)

Now the fourth embodiment of the optical transmission system according to the present invention will be described. FIG. 11 is a diagram depicting the configuration of the fourth embodiment of the optical transmission system according to the present invention. The optical transmission system 4 shown in FIG. 11 further comprises an optical coupler 41 and an pumping light source 42, in addition to the configuration of the optical transmission system 1 according to the first embodiment (FIG. 1). In the following description, the dispersion compensator 23 is disposed at the signal emitting end side of the optical fiber transmission line 30, as shown in FIG. 11, but in the fourth embodiment, the dispersion compensator 23 may be disposed at the signal entering end side of the optical fiber transmission line 30, as shown in FIG. 2, as an application example. Or the dispersion compensator 23 may be disposed in the middle of the optical fiber transmission line 30. The fourth embodiment may have a configuration which allows hybrid transmission, where the transmission speed is different among the signal channels, as shown in FIG. 3, as another application example.

The pumping light source 42 outputs the Raman amplification pumping light, which Raman-amplifies the signal light in the dispersion compensating optical fiber 23, provided as the dispersion compensator. The optical coupler 41 is disposed in the subsequent stage of the dispersion compensating optical fiber 23 and in the previous stage of the demultiplexer $24_2$, and supplies the pumping light, which is outputted from the pumping light source 42, to the dispersion compensating optical fiber 23, and also outputs the signal channel group included in the second wavelength band $\Lambda_2$ to the demultiplexer $24_2$. It is preferable that the Raman amplification pumping light includes a plurality of pumping channels in the wavelength range of 1.2 μm to 1.3 μm, and in this case, the multiplexed signal light in the wavelength range of 1.3 μm to 1.4 μm can be Raman-amplified. At this time, it is preferable that the dispersion compensating optical fiber 23 has a transmission loss at wavelength 1.38 μm, which is smaller than the transmission loss at wavelength 1.31 μm.

This optical transmission system 4 operates as follows. The signal channels with wavelength $\lambda_n$, which are outputted from the direct modulation light sources $11_n$, are multiplexed by the multiplexer 12, and the multiplexed signal light (including the signal channels with wavelengths of $\lambda_1$ to $\lambda_N$) are sent to the optical fiber transmission line 30. The signal channels with wavelengths of $\lambda_1$ to $\lambda_N$ included in the multiplexed signal light, which propagates through the optical fiber transmission line 30, are demultiplexed into the signal channel group in the first wavelength band $\Lambda_1$ and the signal channel group in the second wavelength band $\Lambda_2$ by the demultiplexer 22. The signal channel group with wavelengths of $\lambda_1$ to $\lambda_M$ included in the first wavelength band $\Lambda_1$, where the absolute value of chromatic dispersion is small, demultiplexed by the demultiplexer 22, are demultiplexed into each channel and are received by the receivers $21_1$ to $21_M$ which each signal channel corresponds to. The signal channel group with wavelengths of $\lambda_{M+1}$ to $\lambda_N$ included in the second wavelength band $\Lambda_2$, where the absolute value of chromatic dispersion is large, demultiplexed by the demultiplexer 22, are dispersion-compensated by the dispersion compensating optical fiber 23, and Raman-amplified in the dispersion compensating optical fiber 23, then are demultiplexed to each signal channel and are received by the receivers $21_{M+1}$ to $21_N$ which each signal channel corresponds to.

At this time, when the bit rate is B (Gb/s) at a specific wavelength in the second wavelength band $\Lambda_2$, where the chromatic dispersion becomes highest in the optical fiber transmission line 30 and the dispersion compensating optical fiber 23, the chromatic dispersion value at this specific wavelength is set to be greater than 0 (ps/nm) but $7500/B^2$ (ps/nm) or less.

Also in the entire system, the loss at each signal channel in the second wavelength band $\Lambda_2$ is set to be smaller than the highest loss among losses in the signal channels in the first wavelength band $\Lambda_1$. Or the lowest received power among the received powers of the receiver for the signal channels in the second wavelength band $\Lambda_2$ is set to be higher than the lowest optical power among the optical powers in the signal channels in the first wavelength band $\Lambda_1$ in the optical fiber transmission line 30. It is preferable that the chromatic dispersion in the optical fiber transmission line 30 and the dispersion compensating optical fiber 23 is greater than 0 (ps/nm) but $7500/B^2$ (ps/nm) or less in each one of the signal channels in the second wavelength band $\Lambda_2$ respectively.

By setting the chromatic dispersion characteristics and the loss characteristics as above, the optical transmission system 4 allows high quality transmission of multiplexed signal light including a plurality of signal channels in the signal wave length band, and becomes a configuration which is particularly suitable for CWDM optical transmission. Also the dispersion compensating optical fiber 23 is selectively disposed only for the signal channel group in the second wavelength band $\Lambda_2$, so system cost decreases. Also the signal channel spacing is wide in CWDM optical transmission, so an inexpensive optical filter can be used as the demultiplexer 22. In the fourth embodiment, the signal channel group in the second wavelength band $\Lambda_2$ is Raman-amplified while propagating through the dispersion compensating optical fiber 23, effective loss of the dispersion compensating optical fiber 23 can be decreased, or effective loss of the dispersion compensating optical fiber 23 can be zero.

In particular, 14-channel signal light in the wavelength range of 1.31 μm to 1.61 μm (excluding wavelengths of 1.49 μm and 1.51 μm) are transmitted, where the wavelength of the Raman amplification pumping light is 1.51 μm, and the power of the Raman amplification pumping light is 17 dB. At this time, 4.5 dB gain is obtained at wavelength 1.61 μm, and loss of all the signal channels in the wavelength range of 1.53 μm to 1.61 μm is about 26 dB, therefore a sufficient system margin can be secured.

As described above, according to the present invention, high quality transmission of signal light where a plurality of signals channels within the signal wavelength band are multiplexed, becomes possible, and a system particularly suitable for CWDM optical transmission can be obtained. Also the dispersion compensation is disposed only for the signal channels in the second wavelength band, and an inexpensive optical component can be used for the demultiplexer, so system cost decreases.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical transmission system, comprising:
   an optical transmitter including a direct modulation light source, said optical transmitter outputting signal light in a signal wavelength band;
   an optical receiver receiving the signal light;
   an optical fiber transmission line, as a transmission medium through which signal light where a plurality of signal channels are multiplexed propagates, provided between said optical transmitter and said optical receiver; and
   a dispersion compensator provided on one of an optical path between the signal transmitting end of said optical transmitter and the signal entering end of said optical fiber transmission line, and an optical path between the signal emitting end of said optical fiber transmission line and the signal receiving end of said optical receiver, said dispersion compensator dispersion-compensating for a chromatic dispersion of signal channel group in a second wavelength band other than a first wavelength band which includes a zero-dispersion wavelength of said optical fiber transmission line among the plurality of signal channels,
   wherein, when a bit rate is B (Gb/s) at a specific wavelength in the second wavelength band where a total chromatic dispersion in said optical fiber transmission line and said dispersion compensator becomes the highest, a chromatic dispersion value at the specific wavelength is greater than 0 (ps/nm) but $7500/B^2$ (ps/nm) or less, and
   wherein, in said entire optical transmission system, loss in each signal channel in the second wavelength band is smaller than the highest loss among losses in the signal channels in the first wavelength band.

2. An optical transmission system according to claim 1, wherein a total chromatic dispersion in said optical fiber transmission line and said dispersion compensator is greater than 0 (ps/nm) but $7500/B^2$ (ps/nm) or less in all the signal channels in the second wavelength band.

3. An optical transmission system according to claim 1, wherein the bit rate of at least one signal channel among the signal channels included in the second wavelength band is higher than any bit rate of all the signal channels in the first wavelength band.

4. An optical transmission system according to claim 1, wherein said dispersion compensator includes a dispersion compensating optical fiber.

5. An optical transmission system according to claim 1, wherein said optical fiber transmission line includes a single-mode optical fiber having a zero-dispersion wavelength which exists near a wavelength of 1.3 μm.

6. An optical transmission system according to claim 1, wherein said optical fiber transmission line, at a wavelength of 1.38 μm, has a transmission loss smaller than a transmission loss at a wavelength of 1.31 μm.

7. An optical transmission system according to claim 1, wherein said optical fiber transmission line has a zero-dispersion wavelength which exists in a wavelength range of 1.35 μm to 1.5 μm.

8. An optical transmission system according to claim 1, further comprising pumping light supply means for supplying Raman amplification pumping light into said optical fiber transmission line so as to Raman-amplify the signal light.

9. An optical transmission system according to claim 8, wherein said pumping light supply means supplies the Raman amplification pumping light, where a plurality of pumping channels in a wavelength range of 1.2 μm to 1.3 μm are multiplexed, into said optical fiber transmission line.

10. An optical transmission system according to claim 4, further comprising pumping light supply means for supplying Raman amplification pumping light into said dispersion compensating optical fiber so as to Raman-amplify the signal light.

11. An optical transmission system, comprising:
    an optical transmitter including a direct modulation light source, said optical transmitter outputting signal light in a signal wavelength band;
    an optical receiver receiving the signal light;
    an optical fiber transmission line, as a transmission medium through which signal light where a plurality of signal channels are multiplexed propagates, provided between said optical transmitter and said optical receiver; and
    a dispersion compensator provided on one of an optical path between the signal transmitting end of said optical transmitter and the signal entering end of said optical fiber transmission line, and an optical path between the signal emitting end of said optical fiber transmission line and the signal receiving end of said optical receiver, said dispersion-compensator dispersion-compensating for a chromatic dispersion of a signal channel group in a second wavelength band other than a first wavelength band which includes a zero-dispersion wavelength of said optical fiber transmission line among the plurality of signal channels,
    wherein, when a bit rate is B (Gb/s) at a specific wavelength in the second wavelength band where a total chromatic dispersion in said optical fiber transmission line and said dispersion compensator becomes the highest, a chromatic dispersion value at the specific wavelength is greater than 0 (ps/nm) but $7500/B^2$ (ps/nm) or less, and
    wherein the lowest received power among the received powers for the signal channels in the second wavelength band is higher than the lowest optical power among the optical powers in said optical fiber transmission line of the signal channels in the first wavelength band.

12. An optical transmission system according to claim 11, wherein the total chromatic dispersion in said optical fiber transmission line and said dispersion compensator is greater than 0 (ps/nm) but $7500/B^2$ (ps/nm) or less in all the signal channels in the second wavelength band.

13. An optical transmission system according to claim 11, wherein the bit rate of at least one signal channel among the signal channels included in the second wavelength band is higher than any bit rate of all the signal channels in the first wavelength band.

14. An optical transmission system according to claim 11, wherein said dispersion compensator includes a dispersion compensating optical fiber.

15. An optical transmission system according to claim 11, wherein said optical fiber transmission line includes a single-mode optical fiber having a zero-dispersion wavelength which exists near a wavelength of 1.3 µm.

16. An optical transmission system according to claim 11, wherein said optical fiber transmission line, at the wavelength of 1.38 µm, has a transmission loss smaller than a transmission loss at the wavelength of 1.31 µm.

17. An optical transmission system according to claim 11, wherein said optical fiber transmission line has a zero-dispersion wavelength which exists in a wavelength range of 1.35 µm to 1.5 µm.

18. An optical transmission system according to claim 11, further comprising pumping light supply means for supplying Raman amplification pumping light into said optical fiber transmission line so as to Raman-amplify the signal light.

19. An optical transmission system according to claim 18, wherein said pumping light supply means supplies the Raman amplification pumping light, where a plurality of pumping channels within a wavelength range of 1.2 µm to 1.3 µm are multiplexed, into said optical fiber transmission line.

20. An optical transmission system according to claim 14, further comprising pumping light supply means for supplying Raman amplification pumping light into said dispersion compensating optical fiber so as to Raman-amplify the signal light.

* * * * *